J. DECKER.
Hand-Seeder.
No. 17,081.
Patented Apr. 21. 1857.
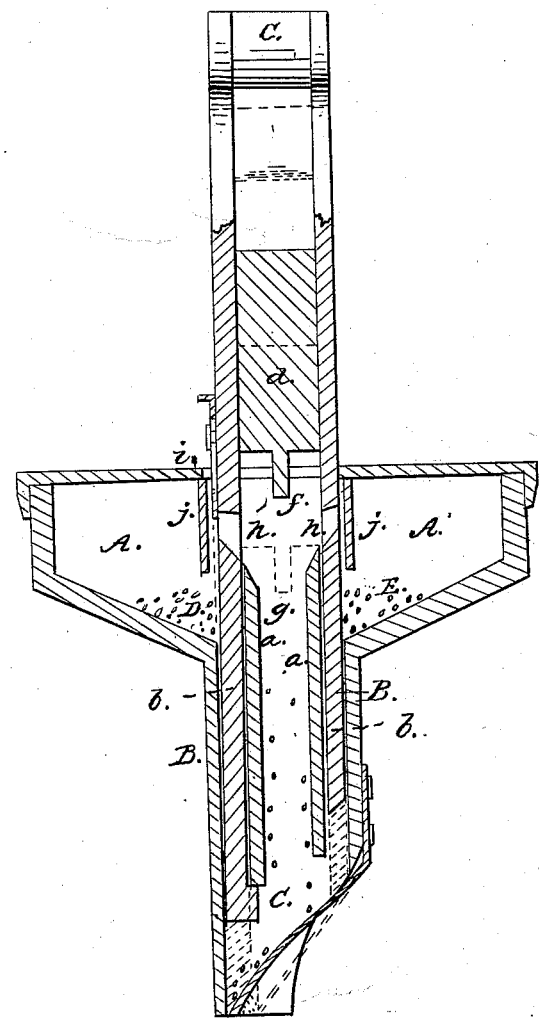

UNITED STATES PATENT OFFICE.

JOHN DECKER, OF SPARTA, NEW JERSEY.

IMPROVEMENT IN HAND SEED-PLANTERS.

Specification forming part of Letters Patent No. 17,081, dated April 21, 1857.

*To all whom it may concern:*

Be it known that I, JOHN DECKER, of Sparta, in the county of Sussex and State of New Jersey, have invented a new and Improved Machine for Planting Seed by Hand; and I do hereby declare that the following is a full, clear, and exact description of the same, reference being had to the annexed drawing, making a part of this specification, said drawing being a vertical section of my improvement.

My invention consists in the employment or use of two hoppers, a seed-elevator provided with two slides, and a clearer fitted within a box having three passages, the whole being arranged as will be hereinafter shown, whereby two different kinds of seed, or seed and fertilizing material, may be planted at the same time and the choking of the conveyer-spout effectually guarded against.

To enable those skilled in the art to fully understand and construct my invention, I will proceed to describe it.

A A' represent two hoppers, the bottoms of which are inclined downward from their outer to their inner ends. B is a rectangular box, which is attached to the lower parts of the hoppers at their inner ends.

In the box B two vertical partition-plates, $a$ $a$, are placed. These plates extend upward above the bottoms of the hoppers A A', but do not extend quite down to their lower ends. In each of the spaces formed by the plates $a$ $a$ a slide, $b$, is fitted. These slides are connected at their upper ends by a cross-piece, $c$, and are also connected by a block, $d$, some distance below the cross-piece $c$, said block $d$ having a pendent plate, $f$, attached to its lower end, said plate being directly over the center space, $g$, between the two partition-plates $a$ $a$, the space $g$ forming the conveying spout or passage for the seed.

Through each slide $b$ an opening, $h$, is made, and these openings may each be provided with a slide, $i$, so that their size may be increased or diminished, as desired. In the drawing one of the openings is provided with a slide.

Within each hopper A A' a vertical plate, $j$, is secured. These plates are so placed as to cover the openings $h$ when the slides $b$ are elevated.

To the lower end of the box B a plate, C, is attached. This plate may be of sheet metal, and one end is attached to one side of the box, said side being considerably shorter than the opposite side. The plate serves as a flap or door, and its lower end fits close to the lower end of the larger side of the box B, and is kept closed by its own elasticity.

The operation is as follows: The seed D is placed in one of the hoppers, A, and the fertilizer E in the other. When the slides $b$ $b$ are forced down within the box B, the seed and fertilizing material will fall by their own gravity into the openings $h$, the back parts of which are closed by the upper parts of the partition-plates $a$ $a$. When the slides are drawn upward, so that the openings $h$ will be above the upper ends of the partition-plates $a$ $a$, the seed and fertilizing material will fall from the openings $h$ down to the lower end of the passage or spout $g$, and, owing to the inclined flap C, passes directly under the larger slide $b$, and when the slides $b$ $b$ are again depressed, the larger slide forces the plate C out from the longer side of the box B and pushes the seed and fertilizing material from the box B, the openings $h$, while the slides are down, being again filled with seed and fertilizing material. The seed and fertilizing material may be covered by a hoe by hand; or the longer slide $b$ may, when shoved down to its fullest extent, project sufficiently far below the box B as to force the seed into the ground.

The slides $b$ $b$ are operated by hand, the machine being carried by the operator and placed over the desired spots. Each time the slides $b$ $b$ are pushed downward, the plate $f$ passes down between the upper ends of the plates $a$ $a$, and prevents the passage or spout $g$ from being choked or clogged. This clearer is an important feature in the invention, and effectually prevents the choking of the conveyer-spout, which in all of the usual planters frequently occurs, especially if the seed be moist. Instead of fertilizing material, other seed may be placed in the hopper A. This will prove very convenient in many cases, for two kinds of seed are often planted together—as, for instance, corn and pumpkin-seed.

I am aware that reciprocating perforated slides for planting or distributing seed have been previously used, and I do not claim such separately or in themselves considered; but,

Having thus described my invention, what I claim as new, and desire to secure by Letters Patent, is—

The slides $bb$, fitted in the box B, and placed relatively with the hoppers A A', as shown, and the plate or clearer $f$, attached to the block $d$, when the above parts are combined and arranged so as to operate conjointly, as shown, for the purpose specified.

JOHN DECKER.

Witnesses:
MORRIS HOPPAUGH,
HALSEY HOPPAUGH.